H. H. GARNER.
AIR CLEANER.
APPLICATION FILED SEPT. 20, 1918.
1,423,412.
Patented July 18, 1922.
Fig. 1.
Fig. 2.
Fig. 3.
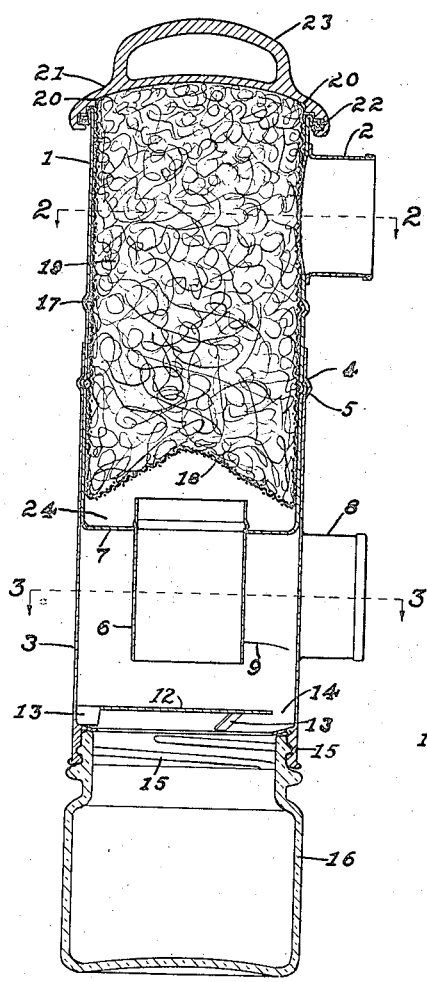
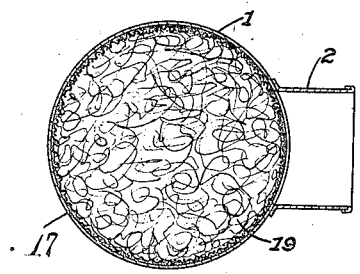
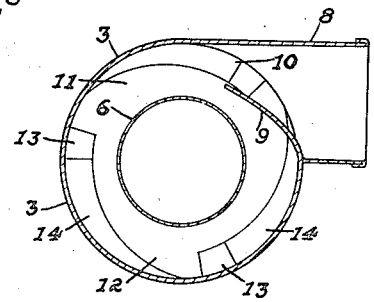
Witnesses
Richard Clifford
F. A. Dew
Inventor
Herman H. Garner

UNITED STATES PATENT OFFICE.

HERMAN H. GARNER, OF POMONA, CALIFORNIA.

AIR CLEANER.

1,423,412.  Specification of Letters Patent.  Patented July 18, 1922.

Application filed September 20, 1918. Serial No. 254,923.

*To all whom it may concern:*

Be it known that I, HERMAN H. GARNER, a citizen of the United States, residing at Pomona, in the county of Los Angeles and State of California, have invented new and useful Improvements in Air Cleaners, of which the following is a specification.

My invention relates to improvements in air cleaners such as are used for removing dust particles from the air supply to internal combustion engines, air-brakes, air compressors, etc., or from any dust-laden air or other gas flowing in a pipe.

An object of my invention is to provide means for removing dust from air, which shall be thorough and which at the same time will operate without causing undue resistance to the passage of air, and more particularly a means which will operate without causing an unduly changing resistance to the passage of air. It has been found in practice that a strainer or filter alone, used in connection with the intake pipe of an internal combustion engine working in a dusty place, soon becomes clogged with dust and offers increased resistance to the passage of air, which causes a relatively increased amount of fuel to be drawn into the engine and seriously interferes with its working.

The present invention is designed to overcome this difficulty by removing most of the dust from the air before it reaches the filter, thus preventing the interstices of the filter from becoming rapidly clogged with dust, and permitting continuous efficient operation of the engine for a reasonable length of time without the necessity of cleaning the filter.

In this invention the greater part of the dust is removed from the air before it reaches the filter by taking advantage of the relative specific gravities of the dust and air as hereinafter described. It has not been found possible in practice to remove all of the dust from the air by this means.

A further object of the invention is to provide a novel form of air filter in which the filter is made of cylindrical shape and in which the air entering the filter is given a rotary motion for the purpose of throwing the dust particles to the outside of the filter, the material of which the filter is composed being so disposed as to cooperate with said rotary motion to effect a very perfect separation of dust particles with a minimum obstruction of the air intake of the device to which it is applied.

Another object of this invention is to provide a filter which is easily removed from its casing for cleaning. Other objects and advantages will appear in the subjoined detail description.

The accompanying drawings illustrate the invention:

Figure 1 is a vertical section of an air cleaner embodying my invention. Fig. 2 is a horizontal section on the line 2—2, Fig. 1. Fig. 3 is a horizontal section on the line 3—3, Fig. 1.

Similar numerals refer to similar parts throughout the several views.

The upper casing 1, to which is attached the outlet 2, fits into the lower casing 3, and is secured therein by the beads 4 and 5 in such a manner that it may be revolved in order to turn the outlet 2 in any desired direction. The tube 6 passes through the bottom 7 of the upper casing 1, and is rigidly attached thereto.

The inlet 8 is attached to the lower casing 3, and the flap 9 in said casing is bent inward toward the tube 6 so as to leave an opening 10 from the inlet 8, tangential to the annular space 11 between the lower casing 3 and the tube 6. The baffle plate 12 is attached by the supports 13 to the lower casing 3, and its edges are notched so as to leave the openings 14. At its lower edge the lower casing 3 is formed with threads 15, which hold the receptacle 16 in position.

Fitting inside the upper casing 1, is a cylinder 17, preferably of wire mesh or other open or perforated material, with a conical bottom 18 and filled with a loose or fibrous material 19 such as curled hair, allowing free passage of air. This fibrous material 19 is coated with oil or similar substance adapted to catch and hold particles of dust. The cylinder 17 is permanently attached at 20 to the cover 21. A dustproof joint is made between the cover 21 and the upper casing 1, by the ring of packing 22. The cover is provided with a handle 23.

In operation the outlet 2 is connected by any suitable means with the intake pipe of the engine or other apparatus to be supplied with clean air, so that all the air reaching it must pass through the air cleaner. The dust laden air enters the inlet 8, and due to the tangential direction of the opening 10, continues with a whirling motion around the annular space 11. The dust particles, being heavier than the air are thrown outward by the centrifugal force against the lower casing 3, where they collect and drop by gravity through the openings 14 and enter the receptacle 16.

The baffle plate 12 separates the receptacle 16 from the strong action of the air above it, and prevents dust particles from being drawn from the receptacle into the tube 6. The receptacle 16 may be filled with water or other liquid if desired, to hold the dust more securely. The supports 13 are shaped so as to force the dust particles downward into the receptacle.

The air after having the larger particles of dust removed in the lower casing 3 passes into the tube 6, which is of smaller diameter than the casing 3, so that the air is accelerated therein without losing its rotary motion. This rapidly rotating air enters the space directly below the conical bottom 18 and due to the relative positions and shape of the upper lip of the tube 6 and the conical bottom 18, a very marked concentration of the dust particles takes place around the periphery of the conical bottom 18, the dust readily adhering to this bottom, which is saturated with oil. This adherent dust is also almost immediately saturated so that it in turn collects more dust which builds up in a sort of cake or layer on the outer edges of the bottom 18 and even around the oil covered walls of the upper casing 1. At the same time the center of the rotating body of air which is relatively free from dust is sucked upwardly through the filter, which catches any small particles of dust, so that clean air is delivered through the outlet 2.

The small amount of dust which collects on the fibers is easily removed by rinsing in any suitable oil. For this purpose the cover 21 is removed, carrying with it the cylinder 17 of wire mesh containing the fibrous material. The whole is conveniently held by the handle 23 while being rinsed.

The upper end of the tube 6, together with the bottom 7, and the upper casing 1, forms a catch basin 24 to catch any surplus oil which might drain from the fibrous material. The conical bottom 18 is so shaped for the purpose of leading any such oil by gravity and capillary attraction down to its lower edge and into the catch basin, thus preventing the oil from dripping through the tube 6 onto the baffle plate 12.

The receptacle 16 is preferably made of glass so that its contents can readily be seen. It is removed for emptying by unscrewing from the lower casing 3.

Obviously, changes in the details of construction may be made without departing from the spirit of the invention and I do not care to limit myself to any particular form or arrangement of parts.

What I claim as my invention is:—

1. A cleaner for catching and holding the dust carried in the air used in an internal combustion engine comprising a casing; an inlet through which air is taken into said casing, said inlet being so formed as to give the air as it enters the casing a rapidly whirling movement; an outlet through which said air is taken from said casing; and a body of oil saturated fibrous material in said casing between said inlet and outlet, said fibrous material having a recess formed in the bottom thereof and extending upwardly into the body of said material.

2. A cleaner for catching and holding the dust carried in the air used in an internal combustion engine comprising a casing; an inlet through which air is taken into said casing, said inlet being so formed as to give the air as it enters the casing a rapidly whirling movement; an outlet through which said air is taken from said casing; and a body of fibrous material saturated with a liquid that does not evaporate readily in air at atmospheric temperatures in said casing between said inlet and outlet, said fibrous material having a recess formed in the bottom thereof and extending upwardly into the body of said material.

3. A cleaner for use in combination with an internal combustion engine comprising a casing; a partition dividing said casing into a primary and a secondary chamber and having a central opening therein; means for introducing air into said primary chamber; means for withdrawing air from said secondary chamber; and a body of fibrous material in said secondary chamber so placed that there is a free expansion space between said body of fibrous material and said partition, said fibrous material having a recess extending into said material and forming an extension of said free expansion space.

4. A cleaner for use in combination with an internal combustion engine, comprising; a casing; a partition dividing the interior of said casing into a primary chamber and a secondary chamber, said primary chamber being cylindrical and said partition consisting of a wall forming the end of said primary chamber, said partition having an opening therein of smaller diameter than said primary chamber; means for causing the air in said chamber to rotate about free paths in said chamber thus forming a vortex from which coarse particles of matter are thrown by centrifugal force; an outlet means for said secondary chamber; and a filtering medium in said secondary chamber so placed that there is a free expansion space between said partition and said filtering medium.

5. A cleaner for use in combination with an internal combustion engine, comprising; a casing; a partition dividing the interior of said casing into a primary chamber and a secondary chamber, said primary chamber being cylindrical and said partition consisting of a wall forming the end of said primary chamber, said partition having an opening therein of smaller diameter than said primary chamber; means for causing the air in said chamber to rotate about free paths in said chamber thus forming a vortex from which coarse particles of matter are thrown by centrifugal force, an outlet means for said secondary chamber; and a filtering medium comprising a body of fibrous material in said secondary chamber so placed that there is a free expansion space between said partition and said filtering medium.

6. A cleaner for use in combination with an internal combustion engine, comprising; a casing; a partition dividing the interior of said casing into a primary chamber and a secondary chamber, said primary chamber being cylindrical and said partition consisting of a wall forming the end of said primary chamber, said partition having an opening therein of smaller diameter than said primary chamber; means for causing the air in said primary chamber to rotate about the axis of said chamber and a filtering medium comprising a body of fibrous material in said secondary chamber so placed that there is a free space between said partition and said filtering, said fibrous material having a recess extending into said material and forming an extension of said free expansion space.

7. A cleaner for use in combination with an internal combustion engine, comprising; a casing; a partition dividing the interior of said casing into a primary chamber and a secondary chamber, said primary chamber being cylindrical and said partition consisting of a wall forming the end of said primary chamber, said partition having an opening therein of smaller diameter than said primary chamber; means for causing the air in said chamber to rotate about free paths in said chamber, thus forming a vortex from which coarse particles of matter are thrown by centrifugal force; an outlet means for said secondary chamber; a filtering medium comprising a body of liquid saturated fibrous material in said secondary chamber so placed that there is a free expansion space between said partition and said filtering medium.

8. A cleaner for use in combination with an internal combustion engine, comprising; a casing; a partition dividing the interior of said casing into a primary chamber and a secondary chamber, said primary chamber being cylindrical and said partition consisting of a wall forming the end of said primary chamber, said partition having an opening therein of smaller diameter than said primary chamber; means for causing the air in said primary chamber to rotate about the axis of said chamber; and a filtering medium comprising a body of liquid saturated fibrous material in said secondary chamber so placed that there is a free space between said partition and said filtering medium, said fibrous material having a recess extending into said material and forming an extension of said free expansion space.

9. A cleaner for catching and holding the dust carried in the air used in an internal combustion engine, comprising: a casing having an inlet through which air may be taken into said casing; means for rotating the air inside said casing; an outlet through which air is taken from said casing; and a body of oil saturated fibrous material in said casing between said inlet and outlet, said fibrous material having a recess formed in the bottom thereof and extending upwardly into the body of said material.

Signed at Pomona, California, this 14th day of September, 1918.

HERMAN H. GARNER.

Witnesses:
 E. B. DIRKING,
 GUY McDONALD.